USOO5134096A

United States Patent [19]
Marazzi et al.

[11] Patent Number: 5,134,096
[45] Date of Patent: Jul. 28, 1992

[54] VITREOUS CERAMIC COMPOSITION WITH HIGH CRYSTALLIZATION SPEED FOR GLAZING CERAMIC PIECES AND IN PARTICULAR TILES

[75] Inventors: Filippo Marazzi, Sassuolo; Mariano Paganelli, Modena, both of Italy

[73] Assignee: Ceramica Filippo Marazzi S.p.A., Bologna, Italy

[21] Appl. No.: 662,832

[22] Filed: Mar. 1, 1991

[30] Foreign Application Priority Data

Mar. 9, 1990 [IT] Italy .................. 19642 A/90

[51] Int. Cl.$^5$ .............................................. C03C 3/085
[52] U.S. Cl. ...................................... 501/69; 501/63; 427/193
[58] Field of Search .................. 501/63, 66, 68, 69; 427/190, 193, 376.2

[56] References Cited

U.S. PATENT DOCUMENTS 4,562,161 12/1985 Mennemann et al. ................. 501/59
4,851,372 7/1989 Lindig et al. ............................ 501/4
5,010,041 4/1991 Koyama et al. ........................ 501/4

*Primary Examiner*—William R. Dixon, Jr.
*Assistant Examiner*—Chris Gallo
*Attorney, Agent, or Firm*—Fleit, Jacobson, Cohn, Price, Holman & Stern

[57] ABSTRACT

Vitreous ceramic composition belonging to the $SiO_2$-$Al_2O_3$-$LiO_2$-$TiO_2$ system in which the components are selected in ranges of definite percentages with the addition of elements exercising a given nucleating effect of promotion of growth of polycrystalline phases and designed to be used as a coating composition to be deposited directly in dry granular form on incandescent supports for producing ceramic with high crystallization speed.

3 Claims, No Drawings

VITREOUS CERAMIC COMPOSITION WITH HIGH CRYSTALLIZATION SPEED FOR GLAZING CERAMIC PIECES AND IN PARTICULAR TILES

The present invention relates to improvements in vitreous compositions for coating tiles. Known examples of compositions with this purpose are illustrated in U.S. Pat. No. 913,036 and they reflect the state of technology known then and employed for coating ceramic pieces.

Tile production technology has undergone considerable evolution in recent years until it recently reached the most advanced technological cycle as illustrated in U.S. Pat. No. 1,183,389 which calls for direct deposit of the coating composition in dry granular form on incandescent biscuit and is named commercially 'Firestream'. This type of technology will therefore be defined below for the sake of brevity.

For this new industrial application it became necessary to develop new vitreous compositions capable of crystallization in very short times. In the Firestream technological cycle the times available for glaze crystallization are reduced to a few minutes.

With such a short heat cycle the majority of compositions used for glazes in conventional technologies give poor or completely unacceptable results. It therefore became necessary to carry out thorough research to identify in the family of known glazes specific compositions which would display specific behaviour so as to make them suited to the purpose.

Said compositions must be able to convert into polycrystalline materials in very short times while providing good control of the operative parameters. Normally, when operating in a range of selected compositions to aid crystallization as much as possible, it becomes very difficult to keep control of the dimensions and of the type of crystalline phases which form.

If it is desired to obtain a matt surface the difficulties increase considerably because the appearance of the product is closely linked with the size of the crystals formed.

It should also be noted that a basic requirement of the compositions sought is that, in addition to high conversion speed from the vitreous phase to polycrystalline phases, the product must originate a layer of completely compact glaze, starting from a granular frit. The glass grains, that is, must be completely welded together without leaving empty spaces or microscopic cavities. This requirement is basic for obtaining tiles with perfectly compact glaze, a characteristic typical of the product obtained by the Firestream technology, i.e. with deposit of glaze directly on incandescent supports. To satisfy these requirements it is necessary that the residual vitreous phase remaining after crystallization show sufficiently low viscosity at application temperature. In this manner the crystals which are formed during devitrification keep a certain mobility and complete sintering of frit grains becomes possible thanks to viscous running of the residual vitreous phase. Crystallizing vitreous compositions not explicity studied for this purpose lead to glazes with porous structure because there does not remain enough vitreous phase to allow settling of the grains or the residual vitreous phase does not have sufficiently low viscosity to allow viscous running.

Another shortcoming which can prevent perfect sintering of the glaze is due to the excessive tendency to crystallization starting from the surface of the grains. If the surface tends to crystallize too fast (surface nucleation) the welding process between the grains of frit is considerably obstructed.

It is therefore necessary to pay the necessary attention to the crystallization process and, in accordance with the invention, it has proved appropriate to introduce into the composition specific chemical elements which would have a suitable nucleation effect, promoting the growth of polycrystalline phases in the grains.

Another difficulty is the fact that the Firestream technological cycle does not call for long periods of heat nucleation as takes place with the known industrial practice of production of vitreous ceramic materials (several hours below the crystallization temperature at a temperature termed 'nucleation'). To be suitable for the Firestream cycle the vitreous compositions must be appropriately nucleated with suitable chemical agents so as to spontaneously supply, with very reduced heat treatment, homogeneous and diffused crystallization throughout the mass. The size of the crystals, in addition, must be effectively controllable so as to supply a product with constant appearance.

The object of the present invention is to propose ceramic glazes with high crystallization speed suited for direct application on incandescent tiles in accordance with Firestream technology and capable of forming a homogeneous and compact glaze with matt surface.

The compositions which are the object of the invention can be classified in the large family of vitreous ceramic materials belonging to the $SiO_2$—$Al_2O_3$—$Li_2O$—$TiO_2$ system already thoroughly studied and rich with industrial applications. The known compositions however give poor results if applied to the Firestream technology. There has been found a narrow range of compositions capable of satisfying in a surprising manner the requirements of this new technology, giving an excellent result in appearance, technical and commercial terms. In accordance with the invention a vitreous ceramic composition for coating ceramic pieces and designed to be deposited directly in granular form on an incandescent support includes the following components in their respective percentages by weight:

| | |
|---|---|
| $SiO_2$ | 60–62% |
| $Al_2O_3$ | 9–11% |
| $LiO_2$ | 7–8% |
| $TiO_2$ | 6–7% |
| MgO | 6.5–7.5% |
| $P_2O_5$ | 2–3% |
| $ZrO_2$ | 0–1.5% |
| $B_2O_3$ | 1–2% |
| $Na_2O$ | 1–2% |
| $K_2O$ | 1–1.5% |
| CaO | 0–1% |

There can be added to this composition colouring oxides such as cobalt, manganese and iron to obtain variously coloured frits which originate coloured polycrystalline materials. These colouring oxides remain confined to the residual vitreous phase and impart a decided colouration to the entire ceramic mass.

By using the compositions which are the object of the present patent it is possible to obtain by the Firestream cycle tiles with matt surface and with perfectly compact and homogeneous glaze. These tiles show exceptional characteristics of resistance to wear and chemical agents and mechanical resistance impossible to obtain by conventional technologies or compositions of conventional glazes applied to this technology.

The exceptional characteristics of resistance are due to the fact that the compositions in question are capable of rapidly separating high percentages of crystalline phases of high hardness (6.5-7 on the Mohs scale). With such a hardness level the glazes obtained can resist very well the abrasive effect of sandy components in the soil and consisting essentially of silicate minerals with hardness less than or equal to that of quartz (6-7 on the Mohs scale). It should however be mentioned that the formation of these phases is a characteristic of all the compositions belonging to the large family of vitreous ceramic products mentioned above.

The crystalline phases present after the devitrification process are made up essentially of synthetic beta-spodumene and rutile and lesser percentages of magnesium silicates and alumotitanates.

These vitreous compositions can be prepared with the techniques of melting and sudden cooling already known in industrial practice. It is however necessary to pay close attention to the temperature of the glaze at the smelting furnace outlet. If the outlet temperature falls below the threshold of conversion of the vitreous state to the crystalline state there could be serious problems. The pouring of the glaze would be immediately blocked by the sudden increase in viscosity caused by formation of crystalline phases. It is therefore advisable to equip the smelting furnace with a burner of adequate size to heat the pouring imbrex.

It is also necessary to give particular care to charging the smelting furnace so as to ensure constant flow of vitrifiable mix of suitable raw materials. Melting conditions must be held as steady as possible to ensure a uniform product.

The melted and suddenly cooled glaze called commonly frit must then be adequately prepared for application in accordance with the Firestream method, for example by using distributing devices covered by U.S. Pat. No. 1,197,042. During the preparation phase it is necessary to take great care to avoid possible contamination with other glazes foreign to the system. The presence of glaze granules of different composition would lead inevitably to the formation of surface defects on the pieces.

To better clarify the characteristics of the compositions which are the object of the present invention there are described below examples of their practical preparation and use.

EXAMPLE 1

Sintered tiles size 30×30 with nut-coloured matt surface produced with Firestream technology.

The following composition was used:

| $SiO_2$ | 61.2 | $Al_2O_3$ | 10.4 | $LiO_2$ | 7.2 |
|---|---|---|---|---|---|
| $TiO_2$ | 6.3 | $MgO$ | 7.1 | $P_2O_5$ | 2.4 |
| $ZrO_2$ | 0.5 | $B_2O_3$ | 1.3 | $Na_2O$ | 1.5 |
| $K_2O$ | 1.3 | $CaO$ | 0.8 | | |

The vitrifiable mixture of suitable raw materials was melted in a tank smelting furnace at 1390° C. and suddenly cooled with water. The frit thus obtained was dried and dry ground using a mill with steel rollers and then defferized.

The granulometric distribution of the grit thus obtained was within the following limits expressed in microns:

| high 630 | 0-0.5 |
|---|---|
| high 500 | 9-12 |
| high 400 | 25-28 |
| high 315 | 21-24 |
| high 250 | 10-15 |
| high 200 | 9-11 |
| high 125 | 9-11 |
| low 125 | 5-7 |

The frit grit was then mixed with corundum grain FEPA 90 in the amount of 90% frit and 10% corundum.

The mixture thus prepared was applied on incandescent tiles size 30×30 in accordance with known Firestream technology in an SITI FS furnace. The quantity applied was 200 g per piece.

Holding in the firing and crystallization zone of the glaze was approximately 7 minutes at a maximum temperature of 1060° C.

The surface of the fired tiles appears satiny, fine, smooth and nut coloured.

The tiles were subjected to the abrasion test in accordance with EN 154 and the weight loss was measured after 25000 revolutions using the PEI machine. Weight loss was 0.5530 g.

This result is to be considered very positive because tiles obtained with conventional glazes give abrasion loss values up to two and even three times higher. The tiles were then subjected to the EN 102 test for deep abrasion called for by the EN standards for unglazed products. The abraded volume after 150 revolutions was 120 mm3. This datum also confirms the extreme resistance of the glaze layer because the value measured is even lower than the limit set for unglazed products (203 mm$^3$).

EXAMPLE 2

Sintered tiles size 30×30 with matt surface and granite-type pricked effect produced with Firestream technology.

The following composition was used:

| | A | B | C |
|---|---|---|---|
| $SiO_2$ | 61.2 | 59.3 | 61.1 |
| $Al_2O_3$ | 10.4 | 10.0 | 10.3 |
| $LiO_2$ | 7.2 | 7.0 | 7.1 |
| $TiO_2$ | 6.3 | 6.1 | 6.3 |
| $MgO$ | 7.1 | 6.9 | 7.0 |
| $P_2O_5$ | 2.4 | 2.3 | 2.4 |
| $ZrO_2$ | 0.5 | 0.5 | 0.5 |
| $B_2O_3$ | 1.3 | 1.3 | 1.3 |
| $Na_2O$ | 1.5 | 1.5 | 1.5 |
| $K_2O$ | 1.3 | 1.3 | 1.3 |
| $CaO$ | 0.8 | 0.8 | 0.8 |
| $MmO_2$ | 0.0 | 3.0 | 0.3 |
| $CoO$ | 0.0 | 0.0 | 0.1 |

The vitrifiable mixtures of suitable raw materials were melted in a smelting furnace as in the preceding example and the frits were ground, sifted and deferrized separately so as to give grits with granulometric distribution within the ranges indicated in the preceding example. The grits of the three frits were then mixed in equal parts and to the mixture was added 10% corundum grain FEPA 90.

The mixture thus prepared was applied as in the preceding example.

The surface of the fired tiles appears smooth, fine and satiny and has a spotted appearance like granite. The results of the PEI abrasion test and the Capon deep abrasion test are fully like those obtained in the previous example, confirming the exceptional resistance to wear of the tiles in question.

We claim:

1. A method for coating ceramic pieces with a vitreous ceramic composition comprising the steps of:
    depositing directly in granular form on an incandescent support said vitreous ceramic composition and wherein said vitreous ceramic composition comprises a mixture of the following ingredients expressed in weight percent:

| | |
|---|---|
| $SiO_2$ | 60–62%; |
| $Al_2O_3$ | 9–11%; |
| $LiO_2$ | 7–8%; |
| $TiO_2$ | 6–7%; |
| MgO | 6.5–7.5%; |
| $P_2O_5$ | 2–3%; |
| $ZrO_2$ | 0–1.5%; |
| $B_2O_3$ | 1–2%; |
| $Na_2O$ | 1–2%; |
| $K_2O$ | 1–1.5%; and |
| CaO | 0–1% | heating said vitreous ceramic composition in order to provide a compact and homogeneous glaze on said ceramic pieces.

2. The method of claim 1 wherein the vitreous ceramic composition further comprises a coloring element.

3. The method of claim 2 wherein the coloring element is a metallic oxide.

* * * * *